United States Patent
Osborne et al.

(10) Patent No.: US 9,529,477 B2
(45) Date of Patent: Dec. 27, 2016

(54) TOUCH SCREEN PANEL USING DIGITALLY ENCODED LIGHT

(71) Applicant: QUALCOMM Incorporated, San Diego, CA (US)

(72) Inventors: Thomas Wesley Osborne, San Diego, CA (US); Vikas Ramachandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/628,625

(22) Filed: Feb. 23, 2015

(65) Prior Publication Data

US 2016/0246446 A1  Aug. 25, 2016

(51) Int. Cl.
  *G06F 3/042* (2006.01)
  *G06F 3/041* (2006.01)

(52) U.S. Cl.
  CPC ........... *G06F 3/0421* (2013.01); *G06F 3/0416* (2013.01); *G06F 3/0428* (2013.01); *G06F 2203/04109* (2013.01)

(58) Field of Classification Search
  CPC ...... G06F 3/0421; G06F 3/042; G06F 3/0428; G06F 2203/04109; G06F 3/0416
  See application file for complete search history.

(56) References Cited

U.S. PATENT DOCUMENTS

| 6,392,167 | B1 | 5/2002 | Nakagawa |
| 7,855,716 | B2 | 12/2010 | McCreary et al. |
| 8,284,173 | B2 | 10/2012 | Morrison |
| 8,633,918 | B2 | 1/2014 | Kim et al. |
| 2012/0146950 | A1 | 6/2012 | Park et al. |
| 2014/0085266 | A1* | 3/2014 | Lim ................. G06F 3/042 345/175 |

FOREIGN PATENT DOCUMENTS

| WO | 2009012586 A1 | 1/2009 |
| WO | 2010015410 A2 | 2/2010 |

OTHER PUBLICATIONS

International Search Report and Written Opinion—PCT/US2016/013259—ISA/EPO—Jun. 15, 2016 (11 pages).

* cited by examiner

*Primary Examiner* — Latanya Bibbins
(74) *Attorney, Agent, or Firm* — Shumaker & Sieffert, P.A.

(57) ABSTRACT

Techniques are described for determining a contact location on a touch screen panel. The techniques transmit an optical signal that includes digital bits through the touch screen, and determine for which digital bits the optical power level reduced. Based on the determined digital bits, the techniques determine the contact location on the touch screen panel.

16 Claims, 4 Drawing Sheets

TOUCH SCREEN PANEL USING DIGITALLY ENCODED LIGHT

TECHNICAL FIELD

This disclosure relates to touch screen panels, and more particularly, to determining location of interaction on the touch screen panels.

BACKGROUND

Touch screen panels are common user interfaces in which a user interfaces with a device that includes or is otherwise coupled to a touch screen panel by selectively contacting different locations on the touch screen panel. A controller determines the location where the user contacted the touch screen panel, and outputs information indicative of the contact location on the touch screen panel. The device performs one or more functions based on the information indicative of the contact location on the touch screen panel.

SUMMARY

In general, the disclosure describes techniques for detecting contact with a touch screen panel and determining a location on the touch screen panel of the detected contact based on changes in optical power levels of digital bits of a data pattern of an optical signal zigzagging through the touch screen panel. A controller may determine the contact location on the touch screen panel based on positions of the digital bits in the data pattern whose amplitude changed.

In one example, the disclosure describes a method of interfacing, the method comprising receiving an electrical signal that is generated from an optical signal, wherein the optical signal is outputted through the touch screen panel and includes a plurality of digital bits of a frame of a data pattern, determining, from the electrical signal, one or more of the digital bits in the frame for which a power level reduced relative to other digital bits in the frame, determining a contact location on the touch screen panel where contact with a surface of the touch screen panel was made based on the determined digital bits in the frame for which the power level reduced relative to the other digital bits in the frame, and outputting information indicating the determined contact location.

In one example, the disclosure describes a device for interfacing, the device comprising a touch screen panel, an optical signal source configured to output an optical signal through the touch screen panel, wherein the optical signal includes a plurality of digital bits of a frame of a data pattern, and one or more processors configured to receive an electrical signal generated from the optical signal, determine, from the electrical signal, one or more of the digital bits in the frame for which a power level reduced relative to other digital bits in the frame, determine a contact location on the touch screen panel where contact with a surface of the touch screen panel was made based on the determined digital bits in the frame for which the power level reduced relative to the other digital bits in the frame, and output information indicating the determined contact location.

In one example, the disclosure describes a device for interfacing, the device comprising means for receiving an electrical signal that is generated from an optical signal, wherein the optical signal is outputted through the touch screen panel and includes a plurality of digital bits of a frame of a data pattern, means for determining, from the electrical signal, one or more of the digital bits in the frame for which a power level reduced relative to other digital bits in the frame, means for determining a contact location on the touch screen panel where contact with a surface of the touch screen panel was made based on the determined digital bits in the frame for which the power level reduced relative to the other digital bits in the frame, and means for outputting information indicating the determined contact location.

In one example, the disclosure describes a computer-readable storage medium having instructions stored thereon that when executed cause one or more processors to receive an electrical signal that is generated from an optical signal, wherein the optical signal is outputted through the touch screen panel and includes a plurality of digital bits of a frame of a data pattern, determine, from the electrical signal, one or more of the digital bits in the frame for which a power level reduced relative to other digital bits in the frame, determine a contact location on the touch screen panel where contact with a surface of the touch screen panel was made based on the determined digital bits in the frame for which the power level reduced relative to the other digital bits in the frame, and output information indicating the determined contact location.

The details of one or more examples are set forth in the accompanying drawings and the description below. Other features, objects, and advantages will be apparent from the description, drawings, and claims.

DETAILED DESCRIPTION

Figure 1:
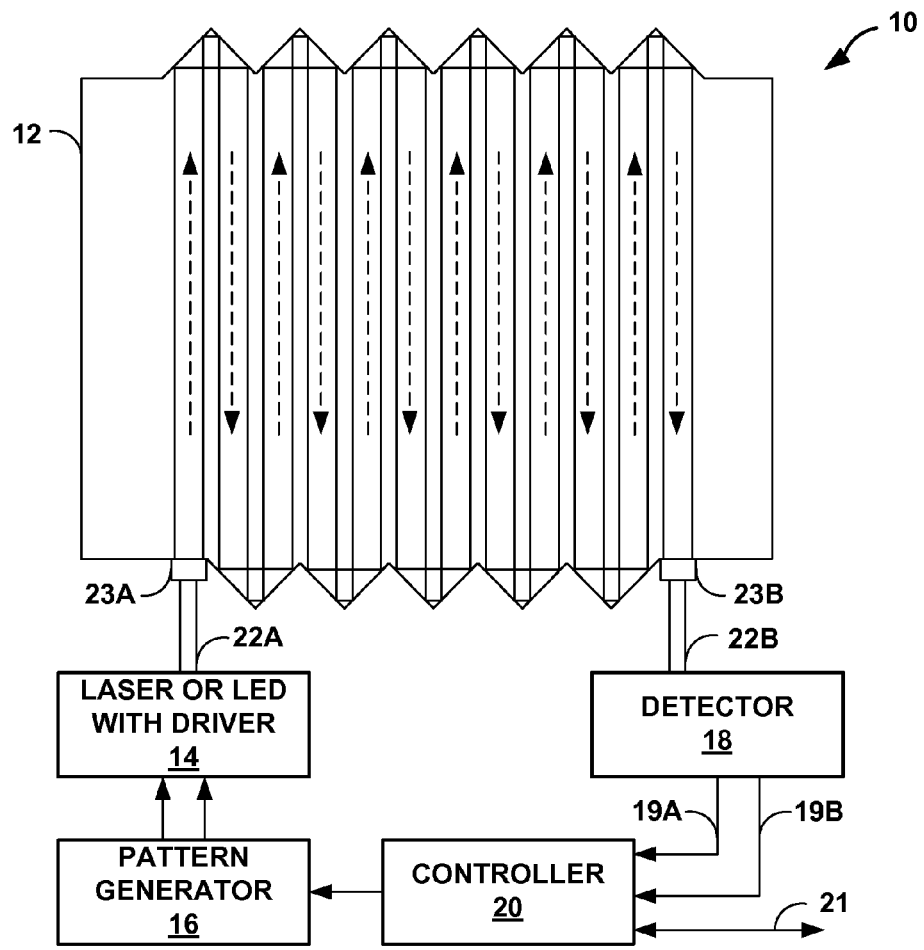
FIG. 1 is a block diagram illustrating a system for implementing one or more example techniques of interfacing with a touch screen panel.

A user contacts a touch screen panel, and based on the location of the contact, a device performs one or more functions. As an example, on many mobile phones, the touch screen panel is the primary user interface. The touch screen panel displays a plurality of icons at specific locations, where each icon represents a different application. The user contacts the touch screen panel at a location that displays an icon. The device determines the contact location and determines which icon is displayed at the contact location on the touch screen panel. In response, the device executes the application represented by the displayed icon.

In some examples, a touch screen panel couples to a display, where the display itself may not be touch sensitive. In these examples, the touch screen panel displays the icons in the sense that the user can see the icons through the touch screen as presented on the non-touch sensitive display. In other words, in some examples, it is the combination of the touch screen panel and the non-touch sensitive display that form a touch sensitive user interface.

The device may be configured to detect contact with the touch screen panel and determine the location of the contact (i.e., contact location). This disclosure describes example optical techniques for detecting contact with the touch screen panel and determining the contact location based on changes to a data pattern defined in an optical signal that is transmitted into the touch screen panel.

A controller may cause an optical signal source (e.g., laser or light-emitting-diode (LED)) to output an optical signal. For ease, the description is of the optical signal source is described with respect to a laser. In some examples, the laser may be positioned on a side of the touch screen panel; however, the techniques described in this disclosure do not require the laser to be positioned on a side of the touch screen panel. In general, a controller may cause a laser to output an optical signal that travels through the touch screen panel.

The touch screen panel, at the opposite end of the laser, may include a pair of mirrors, as described in more detail below, that reflect the optical signal back into the touch screen panel, but shifted a column or row of the touch screen panel, and the touch screen panel, at the opposite end of the column or row, may include another pair of mirrors, as described in more detail below, that reflect the optical signal back into the touch screen panel. In this way, mirrors placed on opposite ends of the touch screen panel cause the optical signal to zigzag through the touch screen panel, and output out of the touch screen panel to a detector, and then to the controller.

It should be understood that such a zigzag pattern through the touch screen panel is described for ease of understanding. The techniques described in this disclosure may be applicable to other example patterns through the touch screen panel, including examples where the laser is not necessarily positioned on a side of the touch screen panel.

The index of refraction of the touch screen panel may be such that even if the optical signal enters at different angles, the optical signal reflects internally, such as via total internal reflection (TIR), and does not escape the touch screen panel. However, when contact is made with the touch screen panel, the index of refraction changes. For example, if a user places his or her finger on the touch screen panel, the index of refraction of the touch screen panel changes where the user placed his or her finger. The change in the index of refraction causes some, but not all, of the optical power of the optical signal to escape the touch screen panel, thereby reducing the power of the signal that reflects internally.

For example, the change in the index of refraction causes the optical signal to reflect in many different angles from the contact location. The angle of some of the reflected optical signals may be too large for the index of refraction of the touch screen panel to keep the reflected optical signal within the touch screen panel. However, the angle of some of the other reflected optical signals may be small enough for the index of refraction of the touch screen panel to keep the reflected optical signal within the touch screen panel.

The escape of some of the optical power of the optical signal causes a reduction in the optical power of the optical signal. For example, without contact, the optical power of the optical signal that the detector receives from the touch screen panel is relatively the same as the optical power of the optical signal that the laser transmitted into the touch screen panel. With contact, however, the optical power of the optical signal that the detector receives from the touch screen panel is appreciably less than the optical power of the optical signal that the laser transmitted into the touch screen panel.

In the techniques described in this disclosure, the optical signal includes a data pattern such as a pseudo-random data pattern that includes a plurality of digital bits (i.e., digital ones and digital zeros). When there is contact with the touch screen panel, the optical power of the digital bits that pass through below the contact location reduces because some of the optical power escapes the touch screen panel (i.e., there is a reduction in the amplitude of the digital bits).

If the controller determines that there is a change in the optical power of one or more digital bits received by the detector (e.g., a reduction in the optical power of the digital bits), the controller may determine that a user made contact with the touch screen panel (e.g., detect contact). For example, the detector may convert the optical signal into an electrical signal, and the controller may determine one or more digital bits for which a power level reduced relative to other digital bits. Since the electrical signal represents the optical signal, for any bits in the electrical signal whose power level reduced relative to other bits, the controller determining one or more digital bits in the electrical signal for which a power level reduced may be considered the same as the controller determining one or more digital bits in the optical signal for which an optical power level reduced. In the techniques described in this disclosure, the controller may also determine the contact location on the touch screen panel (e.g., the location on the touch screen panel where the user contacted the touch screen panel) based on position of the one or more digital bits, within the data pattern, for which the amplitude of the optical power level reduced.

For example, the detector receives digital bits of the data pattern at a first optical power level (e.g., the digital ones are at the first optical power level). After the user contacts the touch screen panel, the detector starts receiving digital bits of the data pattern at a second, lower optical power level (e.g., the digital ones are at the second, lower optical power level). The controller may determine the position in the data pattern of digital bits whose optical power level reduced from the first optical power level to the second optical power level. In accordance with the techniques described in this disclosure, the controller may determine the contact location on the touch screen panel based on the determined position in the data pattern.

There may certain characteristics of the data pattern that allows the controller to determine the contact location on touch screen panel based on the determined position in the data pattern of the digital bits whose optical power level reduced from the first optical power level to the second optical power level. For example, the controller may segment the data pattern into a plurality of frames. Each frame may be separated in the data pattern with a start marker at the beginning of the frame, and an end marker at the end of the frame. However, other ways in which to identify start and ends of the frame are possible, and the techniques are not limited to using start and end markers.

One characteristic of the frame of the optical data pattern may be that the length of the frame (i.e., the number of bits in the frame) is such that a first bit of the frame exits the touch screen panel at approximately the same time that a last bit of the frame enters the touch screen panel. For example, the controller may determine (e.g., pre-configured or on-the-fly) a size of the touch screen panel and a resolution size. Based on the speed of light through the material of the touch screen panel, and the size of the touch screen panel, it is possible to determine the length of time it takes for the optical signal to travel through the touch screen panel. From the resolution size, it may be possible to determine the number of bits needed in a frame of the data pattern. By dividing the determined number of bits needed in the frame by the determined length of time it takes for the optical signal, it may be possible to determine the data rate.

In this example, if the controller causes the laser to output a frame with the determined number of bits at the determined data rate, then when the detector detects a first bit of the frame, the laser will be outputting the last bit of the frame into the touch screen panel. In this example, each digital bit of the frame may be considered as corresponding to a specific location on the touch screen panel. When the controller determines that there is a change in the optical power level of the received digital bits, the controller may determine a position in the frame of the digital bits where the change in the optical power level began. In other words, the controller may determine for which digital bits in the frame the optical power level changed. The controller may determine the location on the touch screen panel that corresponds to the determined digital bits for which the optical power level changed, to determine the contact location on the touch screen panel (e.g., the location on the touch screen panel where the user contacted the touch screen panel).

The controller may then output information indicating the determined contact location. For example, an application executing on a processor may utilize the determined contact location to execute an application, or to otherwise perform some function.

FIG. 1 is a block diagram illustrating a system for implementing one or more example techniques of interfacing with a touch screen panel. As illustrated, system 10 includes touch screen panel 12, optical signal source 14 (e.g., laser 14 or LED 14), pattern generator 16, detector 18, and controller 20. Although pattern generator 16 is illustrated as being separate from controller 20, in some examples, pattern generator 16 may be part of controller 20. In some examples, system 10 may be integrated as part of a device such as video devices, media players, set-top boxes, wireless handsets such as mobile telephones, personal digital assistants (PDAs), desktop computers, laptop computers, gaming consoles, video conferencing units, tablet computing devices, and the like. In some examples, system 10 may be a stand-alone system that connects to a device, such as the example devices described above.

In examples where system 10 is integrated as part of a device, touch screen panel 12 may function to display content generated by the device (e.g., function as the screen for the device) and function as a user-interface for the device. In examples where system 10 is a stand-alone system, touch screen panel 12 may couple to a display of the device. In such examples, touch screen panel 12 is a see-through device that allows the user to view the content of the display, and in addition, may function as a user-interface for the device.

For ease of description, the techniques are described with respect to system 10 being integrated as part of a device. For example, most mobile devices such as smart phones and tablets, include a touch screen device that not only displays the content generated by the device, but also functions as the primary user-interface. For instance, the user contacts the touch screen interface to execute applications, zoom in or zoom out, scroll, and other such functions. Touch screen panel 12 may function as such a touch screen panel that allows the user to interact with the device by contacting a surface of touch screen panel 12.

The function that the device is to perform may be based on the location where the user contacts touch screen panel 12. As an example, the device may cause touch screen panel 12 to display a plurality of icons that each represent an application. To execute a particular application, the user may contact (e.g., touch) a surface of touch screen panel 12 with his or her finger, a stylus pen, or some other device at the location on touch screen panel 12 where the icon representing the application is displayed. In response, the device may execute the application.

In the techniques described in this disclosure, controller 20 is configured to determine a location on touch screen panel 12 at which contact was made (i.e., determine a contact location on touch screen panel 12). Controller 20 transmits information identifying the determined location to a processor of the device, and in turn the processor performs the function based on the contact location.

In examples where system 10 is integrated as part of the device, the processor of the device and controller 20 may be formed as an integrated circuit (IC). For example, the IC may be considered as a processing chip within a chip package, such as a system on chip (SoC). In some examples, the processor of the device and controller 20 may be housed in different integrated circuits (i.e., different chip packages) such as examples where system 10 is a stand-alone system. However, it may be possible that the processor of the device and controller 20 are housed in different integrated circuits in examples where system 10 is integrated as part of the device.

Examples of controller 20 include, but are not limited to, one or more digital signal processors (DSPs), general purpose microprocessors, application specific integrated circuits (ASICs), field programmable logic arrays (FPGAs), or other equivalent integrated or discrete logic circuitry. In some examples, controller 20 may be specialized hardware that includes integrated and/or discrete logic circuitry that allows controller 20 to perform the example techniques described in this disclosure.

In some examples, controller 20 may include programmable components in addition to or instead of specialized hardware. In such examples, controller 20 may execute one or more instructions that cause controller 20 to perform the example techniques described in this disclosure. For example, a memory device (not shown) may store the instructions that when executed by controller 20 cause controller 20 to perform the example techniques described in this disclosure. Examples of the memory device include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some examples, the memory device is a non-transitory storage medium. The term "non-transitory" may indicate that the storage medium is not embodied in a carrier wave or a propagated signal. However, the term "non-transitory" should not be interpreted to mean that the memory device is non-movable or that its contents are static.

Optical signal source 14 (e.g., laser 14 or LED 14) transmits an optical signal, via fiber link 22A into a side of touch screen panel 12, based on the data pattern outputted by pattern generator 16. For ease, the description of optical signal source 14 is described with laser 14. Controller 20 selects the data pattern that pattern generator 16 outputs. The data pattern that pattern generator 16 outputs includes a plurality of digital bits (digital ones and digital zeros), and may be a pseudo-random data pattern. For example, for every digital one in the data pattern from pattern generator 16, laser 14 outputs light at a certain optical power level. For every digital zero in the data pattern from pattern generator 16, laser 14 may not output light, or may output light at a very low optical power level. Examples of laser 14 include, but are not limited to, a Fabry-Perot Laser Diode or a Vertical Cavity Surface Emitting Laser (VCSEL).

As illustrated in FIG. 1, the optical signal that laser 14 transmits travels below the surface of touch screen panel 12, and within the width of touch screen panel 12 (e.g., within a top and bottom surface of touch screen panel 12). The index of refraction of the top and bottom surface of touch screen panel 12 may cause the transmitted optical signal to remain within touch screen panel 12.

As illustrated, laser 14 transmits an optical signal that travels down the side in which laser 14 inserted the optical signal to the opposite side of touch screen panel 12. Laser 14 transmitting the optical signal from a side is provided for purposes of illustration only, and other ways in which laser 14 may output the optical signal into touch screen panel 12 are possible.

Placed at the end of touch screen panel 12 are two mirrors orthogonal to each other. The mirrors are formed by having the edges of the glass plate coated with a mirror reflective material. The first mirror causes the optical signal to bend 90° (rightward in FIG. 1), and the second mirror causes the optical signal to bend another 90° (downward in FIG. 1) for a full 180° turn. Placed at the other end of touch screen panel 12 are two more mirrors that cause the optical signal to turn again by 180°, and the process repeats until the optical signal exits touch screen panel 12 via fiber link 22B to detector 18. Using techniques other than mirrors to turn the direction of the optical signal by 180° may be possible.

For example, the mirrors may be shaped in a way similar to lenses where by the laser beam can be shaped or reshaped to compensate for artifacts affecting the laser beam or artifacts that will affect the laser beam. In some examples, the optical signal may travel through touch screen panel 12 in other ways as well, such as diagonally, as one example, using mirrors or other techniques to turn the direction of the optical signal.

In the example of FIG. 1, the optical signal may zigzag through touch screen panel 12, as illustrated by the dashed arrows, until the optical signal exits touch screen panel 12. In this manner, the techniques described in this disclosure may utilize a single laser 14 and a single detector 18, rather than including a plurality of lasers 14 placed along one side of touch screen panel 12 and corresponding detectors 18 on the opposite side of touch screen panel 12. However, the techniques are not so limited, and may be extended to examples with multiple lasers 14 and multiple detectors 18.

Detector 18 may include a photodiode (not shown) that converts the optical signal into an electrical signal. Examples of the photodiode include, but not limited to, a PIN diode or an Avalanche Photodiode (APD).

By way of example, the optical power of a digital one in the data pattern included in the optical signal causes the photodiode to output a current signal higher in level than the current signal when a digital zero is received by the photodiode. Detector 18 may convert the photodiode signal into digital voltage or current levels, such as a high voltage and or a low voltage commonly found in digital circuits with digital levels. Detector 18 may, for example, include a Transimpedance Amplifier (TIA) among other circuitry to facilitate the data detection and generating of an output electrical voltage signal representing the received detected data.

Controller 20 may receive a digital electrical signal or signals from detector 18. For example, controller 20 may receive the current from the photodiode of detector 18, or in some examples, a transimpedance amplifier (TIA) may convert the current from the photodiode to a voltage that controller 20 receives.

Figure 2:
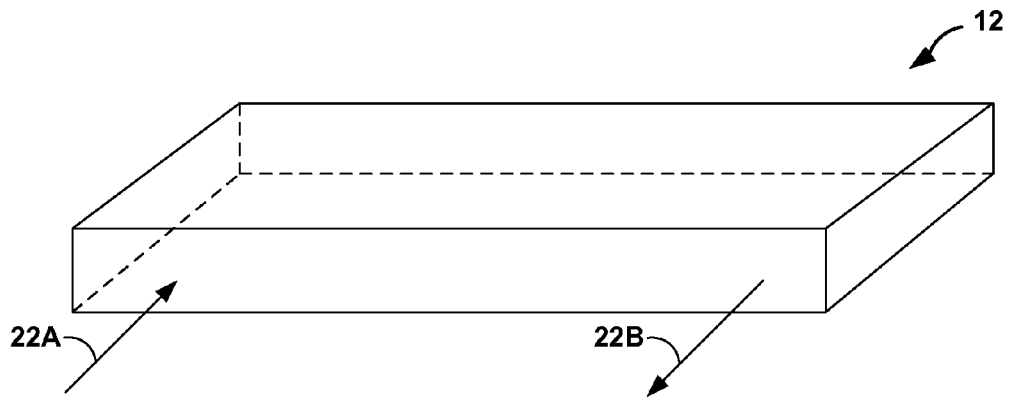
FIG. 2 is a conceptual diagram illustrating an example location of entry and exit of an optical signal in a touch screen panel.

FIG. 2 is a conceptual diagram illustrating an example location of entry and exit of an optical signal in a touch screen panel. For instance, FIG. 2 illustrates a side view of touch screen panel 12, relative to the top view of touch screen panel 12 in FIG. 1. As illustrated, the optical data pattern enters along a side of touch screen panel 12 and exits along the same side or possibly any other side of touch screen panel 12, where for example it is also possible an optical arrangement can be used where the optical signal may enter or exit from the top or bottom of the panel. For purposes of clarity, the word "top side" means the side of the panel that is touched and the "bottom side" refers to the opposite side, which is the side facing or incorporated in or part of the display showing visual content. However, the techniques described in this disclosure are not so limited. In some examples, the entry and exit point of the optical data pattern may different sides of touch screen panel 12.

As the light beam enters touch screen panel 12 (e.g., the optical signal that laser 14 outputs), the light beam expands, as illustrated in FIG. 1. This expansion may cause the light beam to reach a top side and/or bottom side of touch screen panel 12. However, rather than exiting from the top or bottom of touch screen panel 12, the light beam reflects from the top or bottom of touch screen panel 12 and remains trapped inside touch screen panel 12.

For example, touch screen panel 12 may be formed with a material whose index of refraction is such that the optical signal reflects internal to touch screen panel 12. In other words, touch screen panel 12 may be formed with a materials or substances whose index of refraction at the panel surface is such that the optical light rays within the panel reflects internal to touch screen panel 12 when the optical index of refraction of the panel materials or substances at its surface, the air and or materials or substances making "firm" contact with the touch screen panel surface and the angle of incidence of the rays to the surface of the panel at a particular location meet the requirements for optical total internal reflection. Accordingly, the optical power level of the digital bits outputted by laser 14 should be approximately the same as the optical power level of the digital bits that detector 18 receives Examples of touch screen panel 12 include display types, such as curved displays, flexible displays, and other such types of displays. In general, the display types of touch screen panel 12 include displays with the ability to route optical signals, allowing for techniques described in this disclosure to be implemented. Examples of the materials used to form touch screen panel 12 include, but not limited to, glass, a type of glass referred to as "Gorilla Glass", polymers, plastics and other suitable materials or substances, where the materials or substances do not need to be flat or rigid. For instance, as described above, display types such as curved displays and flexible displays may also be utilized.

In some examples, as the light beam from laser 14 that is used to carry digital optical signal enters touch screen panel 12 an optical coupling arrangement can be used so that some of the light rays can make contact with the top surface and may make contact with the bottom surface of the panel 12. Such methods can include, but not limited to, a beam expander.

For example, in locations where air is in contact with the panel surface the light rays can reflect off the surface and stay within the panel. It is possible the light can escape from the panel at various surfaces locations if the surface location is non-ideal, such as having scratches, surface roughness, imperfections, mares, edges, substances, non-planar properties, other aspects or properties and or places and locations where the panel is touched by a person, object or thing, that enable the light to escape from the panel. It is possible the light may leak out of the panel at areas and or locations. It is also possible the light can be absorbed within in the panel or be cancelled at locations where light interfaces with other light. It is also possible light may be scattered within the panel by imperfections or other aspects of optical and or materials.

In general, if the index of refraction of touch screen panel 12 changes, then some of the optical power of the optical signal may escape touch screen panel 12, causing a change in the optical power level of the digital bits that detector 18 receives. One of the causes of the change in the index of refraction is physical contact with a surface of touch screen panel 12. For example, if a user places his or her finger or a stylus pen on the surface touch screen panel 12, the index of refraction at the location where the user contacted touch screen panel 12 changes. In this case, the portion of the light beam of the optical signal that reaches the contact location on touch screen panel 12 reflects in various angles (e.g., scatters), including angles that allow the reflected light beam to escape touch screen panel 12. Because some of the optical power of digital bits that flow under contact location escapes touch screen panel 12, the optical power level of the digital bits reduce.

Figure 3A:
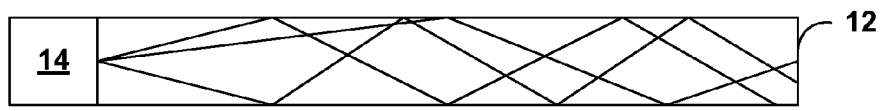
FIGS. 3A and 3B are conceptual diagrams illustrating escape of optical power from a touch screen panel.
Figure 3B:
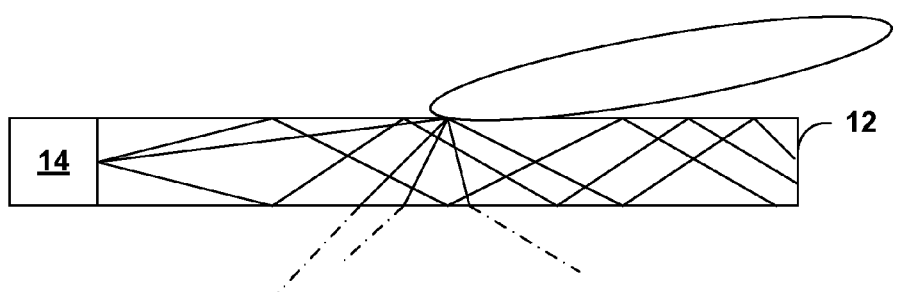

FIGS. 3A and 3B are conceptual diagrams illustrating escape of optical power from a touch screen panel. FIGS. 3A and 3B illustrate the propagation of a light beam from laser 14. For example, some of the light beam rays are shown reflecting off the surfaces in touch screen panel 12. FIGS. 3A and 3B may be considered as illustrating the propagation of a digital one of the data pattern from pattern generator 16 in the optical signal. Accordingly, if a portion of the light beam escapes touch screen panel 12, the optical power level of the digital one is reduced relative to other digital bits for which the light beam does not escape. In other words, the escape of a portion of the light beam does not mean that a digital bit is lost, rather some of the energy that is used to represent a digital one is lost, meaning that the optical power level of the digital one is reduced.

For instance, as described above, laser 14 transmitting an optical pulse at a first power level corresponds to laser 14 transmitting a digital one, and laser 14 transmitting an optical pulse at a second, lower power level (or not transmitting an optical pulse) corresponds to laser 14 transmitting a digital zero. If a portion of the light beam carrying the optical pulses at the first and second power levels escapes touch screen panel 12, the optical power of the optical pulse at the first power level reduces.

In FIG. 3A, there is no user or item in contact with touch screen panel 12, and therefore, as illustrated, the light beam remains trapped within touch screen panel 12. In FIG. 3B, there is user contact with touch screen panel 12. The user contact causes the light beam to scatter in many angles. As illustrated, portions of the light beam that reflect from the contact location escape touch screen panel 12 (e.g., in the dashed lines), while other portions of the light beam that reflect from the contact location remain trapped within touch screen panel 12. As described in more detail, in the techniques described in this disclosure, controller 20 may determine for which digital bits in the data pattern the optical power level reduced relative to other digital bits due possibly from the escape of optical power from touch screen panel 14, as illustrated in FIG. 3B, because of user contact with touch screen panel 12.

Figure 4A:
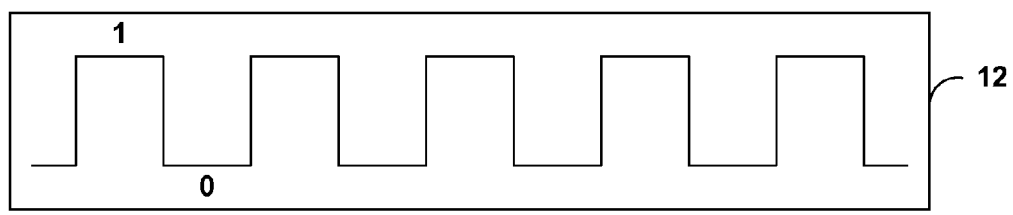
FIGS. 4A and 4B are conceptual diagrams illustrating a reduction in the optical power level of digital bits flowing below a contact location on a touch screen panel.
Figure 4B:
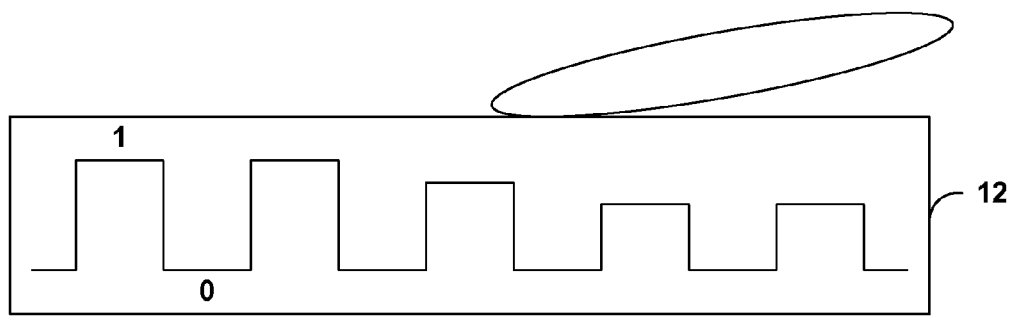

FIGS. 4A and 4B are conceptual diagrams illustrating a reduction in the optical power level of digital bits flowing below a contact location on a touch screen panel. For instance, as illustrated in FIG. 4A, when there is no contact with touch screen panel 12, the amplitude of the digital bits (e.g., the optical power level of the optical pulses that represent the digital bits) flowing through touch screen panel 12 does not change. However, when there is contact with touch screen panel 12, as illustrated in FIG. 4B, the amplitude of the optical power level of at least the digital ones of the data pattern begins to reduce at the point of contact (e.g., the optical power level of the optical pulses that represent digital ones reduces at the point of contact). Thereafter, the amplitude of the optical power levels of the digital ones keeps reducing until passing below the contact location, and then stays at the reduced optical power level.

In the techniques described in this disclosure, detector 18 detects both the data being received from the optical data signal and the relative optical power level of the optical data signal for each data "one" (i.e. "1") bit detected in the optical data stream. Digital signal connection 19A carries the detected received data (e.g. ones and or zeros digital bit levels) and digital connection 19B indicates if there was an optical power level change for the corresponding data bit "1" level being received over digital signal connection 19A. Digital signal connections 19A and 19B may be a data line (e.g., on a circuit board) that connects detector 18 to controller 20. In some examples where detector 18 is part of controller 20, digital signal connections 19A and 19B may be internal to controller 20.

The signal on digital signal connection 19B indicates if there was substantially no change in optical power level with respect to the previous optical data "1" power level, or if there was substantially an optical power level decrease with respect to the previous optical data "1" power level, or substantially if there was an increase of optical power level "1" with respect to the previous optical data "1" power level. Controller 20 may make use of the received detected data and or determine if the data bit "1" optical level it received over 19A increased or decreased. If the level decreased then controller 20 may utilize this information to determine a location in the data sequence where touch screen panel 12 may have been contacted. If the level increased then controller 20 may utilize this information to determine a location in the data sequence where a person lifted their skin or an object off of touch screen panel 12.

For instance, in this manner, there may be a correspondence between the data sequence (e.g., the data pattern in the optical signal) and a location on touch screen panel 12. In this way, controller 20 may determine when and the location where touch screen panel 12 was touched or the touch was removed by determining which data "1" bits had its corresponding optical power level change up or down. The data pattern may include frequent enough data "1" levels so that controller 20 may accurately determine the contact location and the location from where contact was removed. In some examples, controller 20 may implement averaging of the received data pattern and detection levels in order to minimize the impact of false detection and increase the accuracy of the identified location where touch was detected as occurring or removed.

For example, controller 20 may cause pattern generator 16 to output a data pattern with certain characteristics at a specified data rate. The data pattern may include a plurality of frames, where each frame includes a plurality of digital bits. The number of digital bits in each of the frames may be such that when laser 14 outputs the digital bits at the data rate, detector 18 is about to receive the first bit of the frame at substantially the same time (e.g., within some threshold time) that laser 14 outputs the last bit of the frame. Conceptually, this can be considered as each bit in the frame corresponding to a specific location on touch screen panel 12.

By way of example, if there is no contact with touch screen panel 12, then the optical power levels of the digital bits in the data pattern that detector 18 receives will be substantially the same as the optical power level of the digital bits that laser 14 transmits (e.g., there may be some minimal power loss, but within a power level threshold). For example, the optical power levels of the digital bits in the data pattern that detector 18 receives will be substantially the same as the optical power level of the digital bits detected previously by detector 18.

When there is contact with touch screen panel 12, for example at location (x, y), there will be a change in the optical power level of the digital bits. For instance, if there is contact with touch screen panel 12 at coordinates (x, y), then the optical power level for digital bits of the frame that had already passed below the contact location would be substantially the same as it was before passing through location (x, y). However, the optical power level for digital bits that had not yet passed through the contact location (x, y) would reduce as they pass through the contact location. In other words, the optical power level of digital bits that had not yet passed through the contact location will reduce relative to other digital bits that had already passed through the contact location.

Controller 20 may determine for which digital bits the optical power level reduced. As illustrated, detector 18 converts the optical signal into an electrical signal (e.g., a current signal or further converts the current signal to a voltage signal). The digital bits in the electrical signal correspond to the digital bits in the optical signal. In some examples, controller 20 may determine for which digital bits in the electrical signal the power level reduced based on information provided by detector 18 via digital signal connections 19A and 19B. Controller 20 may determine for which digital bits in the optical power level reduced based on the digital bits in the electrical signal for which the power level reduced (i.e., the bits in the electrical signal for which the power level reduced are the same bits in the optical signal for which the power level reduced).

By way of example, controller 20 may cause pattern generator 16 to prepend each frame of the data pattern with a start marker (e.g., a plurality of reserved bits to indicate beginning of a frame) and to append each frame of the data pattern with an end marker (e.g., a plurality of reserved bits to indicate end of a frame). In some examples, the digital bits in the frame may be arranged as a pseudorandom data pattern. One characteristic of a pseudorandom data pattern is that a set of digital bits does not repeat within the data pattern.

One example of a pseudorandom data pattern is a $2^7$ PRBS (pseudorandom bitstream) data pattern that includes seven bits that represent all numerical values from 0 to $2^7$.

For example, the $2^7$ PRBS includes 0000000, 0000001, 0000010, 0000011, and so forth until 111111. However, the seven bits need not necessarily be ordered in a numerical ascending or descending order, and may be random within the pattern (e.g., 0000000 may follow 1010101, or any other such random order). In any event, each of the numerical values may not repeat in the data pattern. Other examples of pseudorandom data patterns exist and may be potential examples of digital bits in a frame.

In some examples, controller 20 may receive the start marker and the end marker and determine that one full frame of the data pattern has passed through touch screen panel 12. Because of the pseudorandom nature of the digital bits in the data pattern, controller 20 may be able to uniquely identify a position in the frame where the optical power level of the digital bits changed. For instance, in the $2^7$ PRBS data pattern, a set of seven bits never repeats, and therefore, when controller 20 determines that the optical power level of digital bits changed, controller 20 may determine the position of the digital bits, in the frame, for which the optical power level changed.

For instance, each bit (and possibly multiple bits) in the data pattern corresponds a particular location on touch screen panel 12 based on the timing of when the start marker exited touch screen panel 12. When a user contacts touch screen panel 12, the optical power level of the pulses that represent a digital one and that travel below the contact location will reduce, but the optical power level of the pulses that represent a digital one that were already ahead of the contact location will not change. By determining for which bits the optical power level reduced and because a set of seven bits never repeats (in the example of $2^7$ PRBS data pattern), controller 20 may determine the contact location.

For example, controller 20 may determine a location on touch screen panel 12 that corresponds to the digital bits for which the optical power level reduced relative to other digital bits. Again, in some examples, controller 20 may determine for which bits of the electrical signal the power level reduced, and determine a location on touch screen panel 12 that corresponds to the digital bits for which the optical power level reduced relative to other digital bits based on the digital bits of the electrical signal for which the power level reduced. For instance, the position of each digital bit in the frame of the data pattern corresponds to a location on touch screen panel 12. After determining for which digital bits the power level changed, controller 20 may determine the position of these digital bits in the frame. As noted above, in the PRBS pattern, a set of bits never repeats in the pattern, and so controller 20 may be able to determine the position of these digital bits in the frame since the set to which these digital bits belong does not repeat. Based on the determined position of these digital bits in the frame, controller 20 may determine the location on touch screen panel 12 that corresponds to the position of these digital bits. Based on the determination, controller 20 may determine a contact location on touch screen panel 12 as the location on touch screen panel 12 that corresponds to the digital bits for which the power level reduced.

In the above examples, controller 20 determines the position of digital bits whose power level (e.g., optical power level in context of the optical signal or electrical power level in context of the electrical signal) changed based on the start and end markers prepended and appended to the frame. However, the techniques described in this disclosure are not so limited. In some examples, each of the frames may be unique relative to other frames. In these examples, start and end markers may not be needed, but may be optionally included. In some examples, controller 20 may be configured with the total number of bits in a frame, and may count the number of received bits to determine the end of a frame. In such examples, start and end markers may not be needed, but may be optionally included. Various combinations of the above example techniques of identifying the beginning and ending of a frame may be possible. Also, there may be other techniques for identifying the beginning and ending of a frame, and the techniques described in this disclosure are not limited to the above examples.

Figure 5:
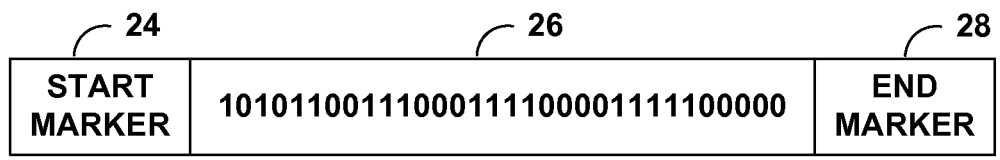
FIG. 5 is a conceptual diagram illustrating an example of a frame that includes the digital bits passing through a touch screen panel.
Figure 6:
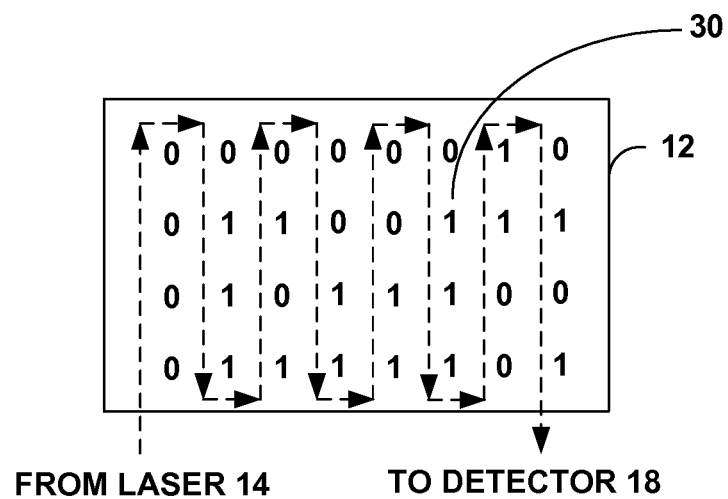
FIG. 6 is a conceptual diagram illustrating an example of digital bits passing through a touch screen panel.

FIG. 5 is a conceptual diagram illustrating an example of a frame that includes the digital bits passing through a touch screen panel. FIG. 6 is a conceptual diagram illustrating an example of digital bits passing through a touch screen panel. Because FIGS. 5 and 6 are interrelated, they are described together.

Controller 20 may cause pattern generator 16 to prepend start marker 24 to frame 26 and append end marker 28 to frame 26. In some examples, pattern generator 16 may be configured to prepend and append start marker 24 and end marker 28 to frame 26 without instruction from controller 20.

As illustrated in FIG. 5, frame 26 includes a plurality of digital bits. The number of bits of frame 26 is illustrated in FIG. 5 merely to assist with understanding. This disclosure describes techniques for determining the number of bits in frame 26 in more detail below. In general, the number of bits in frame 26 may be such that when laser 14 outputs frame 26 at a specified data rate, the first bit of frame 26 is about to exit touch screen panel 12 at substantially a same time that the last bit of frame 26 enters touch screen panel 12. In other words, if laser 14 transmits frame 26 at the specified data rate, detector 18 receives the first bit of frame 26 at approximately the same time that laser 14 outputs the last bit of frame 26.

For instance, FIG. 6 illustrates the zigzag path of frame 26 through touch screen panel 12 with the dashed arrows. As described above, with respect to FIG. 1, respective mirrors at lateral ends of touch screen panel 12 cause the optical signal to turn 90° causing the zigzag path through touch screen panel 12. As illustrated in FIG. 6, due to the zigzag pattern of frame 26 through touch screen panel 12, the first bit of frame 26 is about to exit touch screen panel 12 (e.g., at the bottom-right corner of touch screen panel 12) when the last bit of frame 26 enters touch screen panel 12 (e.g., at the bottom-left corner of touch screen panel 12).

As can be seen in FIG. 6, each digital bit in frame 26 corresponds to a particular location on touch screen panel 12 at the time the first bit of frame 26 is about to exit and the last bit of frame 26 has just entered. In this example, if the user contacts a surface of touch screen panel 12 at a particular location, then the optical power level of digital bits following the digital bit located at the contact location may reduce. For instance, as illustrated in FIG. 6, if the user were to contact the surface of touch screen panel 12 at contact location 30, then the amplitude (e.g., optical power level) of the digital bits following the digital bit located at contact location 30 would reduce, as described with respect to FIG. 4B.

It should be understood that in many systems, the surface area of the user's finger or stylus would be larger than the area on touch screen panel 12. However, for ease, the example is described with the contact area of contact location 30 being the area corresponding to one bit. The techniques described in this disclosure apply the same for instances where the optical power level of multiple bits reduces simultaneously because the surface area of the user's finger or stylus encompasses a larger area.

In the techniques described in this disclosure, controller 20 may determine for which digital bits in frame 26 the optical power level reduced, and determine a position of the digital bits in frame 26 for which the optical power level reduced. For example, in FIG. 6, the optical power level for digital bits surrounding location 30 would reduce, and controller 20 may determine that the optical power level for digital bits surrounding location 30 reduced because the power level of the corresponding digital bits in the electrical signal, received from detector 18, would reduce. In the example illustrated in FIGS. 5 and 6, the digital bits in frame 26 for which the optical power level reduced are positioned as approximately the eleventh bit in frame 26. Based on the position of the digital bits in frame 26 for which the optical power level reduced, controller 20 may determine the location of the digital bits on touch screen panel 12 (e.g., determine location 30). Controller 20 may determine the contact location (e.g., the location where the user contacted touch screen panel 12) as the determined location of the digital bits in frame 26 for which the optical power level reduced.

Controller 20 may determine that the eleventh bit in frame 26 is when the optical power level reduced because of the pseudorandom nature of frame 26. For instance, in the example illustrated in FIGS. 5 and 6, three digital zeros and then a digital one follow the digital bit located at contact location 30. Nowhere else in frame 26 is there a case where the pattern three digital zeros are followed by a digital one. It may also be possible for controller 20 to count the number of bits that controller 20 receives after receiving start marker 24 to determine the position in frame 26 of the digital whose optical power level reduced. However, in examples where no start marker 24 or end marker 28 are utilized, the uniqueness of digital bit pattern may allow controller 20 to determine the position in frame 26 of the digital bits whose optical power level reduced.

In some examples, controller 20 may account for the position of the digital bits in frame 26 because the user may contact touch screen panel 12 at a time when the first bit of frame 26 is not about to exit touch screen panel 12. For instance, FIG. 6 illustrates a specific example where the first bit of frame 26 is about to exit, but there may be cases where the first bit has already exited touch screen panel 12. In other words, FIG. 6 illustrates an example at time T0 when the first digital bit of frame 26 is about to exit touch screen panel 12. Then at time T1 (sometime after time T0), all of the digital bits illustrated in FIG. 6 would shift in accordance to the zigzag pattern illustrated in FIG. 6. In this case, at time T1, the first bit of frame 26 would have already exited touch screen panel 12, and it may be possible for the user to contact touch screen panel 12 at time T1, rather than time T0.

However, even in such cases, controller 20 may still be able to determine the contact location. For example, by determining the position of the digital bits for which the optical power level reduced, and by determining an amount of time that elapsed from which controller 20 received the bits of start marker 24 from detector 18, controller 20 may determine where the digital bits for which the optical power level reduced were located on touch screen panel 12 when the user contacted the surface of touch screen panel 12.

In some examples, a local memory of controller 20 may store a look-up table or some other data structure, or a system memory external to controller 20 that controller 20 can access may store the look-up table or the data structure.

The look-up table, as one example, may store information that identifies the x and y-coordinates of locations on touch screen panel 12 that correspond to positions of digital bits in frame 26 based on the amount of time that elapsed after controller 20 received start marker 24. After controller 20 determines the position of digital bits in frame 26 for which the optical power level reduced and the amount of time that elapsed after controller 20 received start marker 24, controller 20 may determine the x and y-coordinates of the contact location. Controller 20 may output the x and y-coordinates to a processor of a device for further processing.

The above example described situations where a user contacts touch screen panel 12 with a finger or a stylus. In some examples, the user may contact touch screen panel 12 with multiple fingers. For example, to shrink or expand displayed content, the user may place two fingers on touch screen panel 12 and bring them together or further separate them. The techniques described in this disclosure may similarly be able to detect the contact location when the user contacts touch screen panel 12 with multiple fingers.

As described above, due to user contact, the light beam of the optical signal scatters. In some examples, the scattering of the light beam may cause different digital bits to add with one another. For instance, the angle at which a light beam representing a first digital one and the angle at which a light beam representing a second digital one scatter may be such that the two light beams add together, and detector 18 may detect such scattered light. To diminish the effects of detector 18 receiving such scattered light, controller 20 may implement a cross-correlation system.

Also, in the above examples, only one laser 14 is utilized with only one detector 18 on the same side as laser 14. However, the techniques described in this disclosure are not so limited. In some examples, laser 14 and detector 18 may be positioned in different locations than those illustrated, including in locations where laser 14 and detector 18 are not on the same side of touch screen panel 12. Moreover, in some examples, there may be multiple lasers 14 and multiple detectors 18. For instance, rather than using mirrors to turn the light, a detector 18 may receive the light, and another laser 14 may output another light beam.

Using multiple lasers 14 and multiple detectors 18 may increase resolution (e.g., allow controller 20 to determine a smaller contact area on touch screen panel 12 compared to examples where a single laser 14 and a single detector 18 are utilized). For example, using a single laser 14 and a single detector 18, controller 20 may be able to determine the location where the user contacted touch screen panel 12 to one square millimeter. Using multiple lasers 14 and multiple detectors 18, controller 20 may be able to determine the location where the user contacted touch screen panel 12 to one-fourth square millimeter or smaller.

Also, using multiple lasers 14 and multiple detectors 18 may allow in a reduction of the data rate because the data pattern does not need to flow through the entirety of touch screen panel 12, but only through a smaller subset of columns or rows of touch screen panel 12. In examples where there are multiple lasers 14, each laser 14 may output at different carrier frequencies, or at the same frequency (i.e., wavelength), or at the same frequency, where the data pattern is different or the same data pattern is repeated, but shifted in time by, for example one-half a data time period (i.e., phase shifted by one-half as a data period).

However, using a single laser 14 and a single detector 18 may reduce costs and provide sufficient resolution. Furthermore, even in examples with a single laser 14 and a single detector 18, it may be possible to increase resolution (e.g., decrease the area for which controller 20 can determine the contact location) using a smaller light beam, higher data rates, or multiplexed laser carrier frequencies. For example, the resolution may be such that a pointer (e.g., a stylus) can be used to draw very fine lines. Accordingly, the techniques are described with respect to using a single laser 14 and a single detector 18, but the techniques described in this disclosure are not so limited.

In some examples, it may be possible for a processor to estimate features being drawn by a user, such as lines and curves. For example, even if the resolution is not extremely high, the user may be able to draw fine lines and curves. While controller 20 may not be able to determine the exact contact location (e.g., a precise enough contact location), the processor may execute software or hardware that is configured to estimate likely features or shapes being drawn by the user, such as by comparing the calculated lines or shapes to one or more templates of likely features or shapes. The templates, for example, may correspond to lines or shapes that are specifically defined as controls or commands on the touch screen.

In some cases, dirt, oil smudges, scratches and the like may cause the light beam to scatter resulting in a reduction in the optical power level of the digital bits that is not caused from the user contacting touch screen panel 12. Controller 20 may average the digital bits received to subtract the effects from such markings on touch screen panel 12. For example, rather than determining the contact location only based on digital bits of frame 26, controller 20 may determine the contact location over multiple frames (e.g., receive the digital bits for multiple frames). In these examples, controller 20 may average the digital bit values for the multiple frames, which may remove the effects from such markings on touch screen panel 12. Controller 20 may also store a history of the magnitude of the different bits, and use this history to identify likely locations of inadvertent light leakage from touch screen panel 12 based on bit magnitude reductions at locations that do not change for significant periods of time.

In some cases, a user may place a protective shield on the surface of touch screen panel 12. The techniques described in this disclosure are applicable to examples where there is a protective shield covering touch screen panel 12.

As described above, one characteristics of frame 26 may be that as the first bit of frame 26 is about to exit touch screen panel 12, the last bit of frame 26 has just entered touch screen panel 12. The following describes how to determine the number of bits needed to achieve such a result. It should be understood that in some examples, controller 20 may determine on-the-fly the number of bits that are included in frame 26, and may cause pattern generator 16 to output a pseudorandom data pattern that includes the determined number of bits. In some examples, controller 20 may be preconfigured with the number of bits that are included in frame 26, and may not need to make the determination on-the-fly. In some examples, pattern generator 16 may be preconfigured with specific pseudorandom data patterns for each of frames 26, where each of the data patterns includes the number of bits determined in accordance to the below description.

The number of bits in frame 26 may be based on the width of the light beam, the display size of touch screen panel 12, the speed of light through touch screen panel 12, and the data clock rate. In general, the thinner the light beam, the greater the resolution, but that also causes an increase in the data rate. Also, the lager the size of touch screen panel 12, the higher the data rate or the greater the number of bits.

It is also possible for controller 20 or other components in the system to maintain a self-learning methodology to continue to associate a particular location on touch screen panel 12 to a particular data bit location on a particular location on the screen. For example, controller 20 may continue to monitor how many data bits there are in touch screen panel 12 for the location where the first data bit enters touch screen panel 12 and the particular data bit sequence that just left touch screen panel 12. From this, controller 20 may determine continuously how many data bits are in touch screen panel 12. In this example, start and end markers may not be needed.

In some examples, controller 20 may utilize a unique pattern of bits that continuously change by a pseudo random pattern generator or a pattern or patterns stored in a memory location in or out side of the system. There are many other ways to do the like. It is also possible to use error correction methodologies and techniques that will identify errors in the data sequence that may help with data pattern recognition making it possible to determine the number of bits within touch screen panel 12 as described above. There many other ways to associate a bit be it a "1" or "0" bit to a particular location on touch screen panel 12, the above examples are provided merely as a few example techniques.

The following is an illustrative example to assist with understanding. Assume that display size of touch screen panel 12 is 254 mm by 254 mm, assume that the width of light beam is 1 mm in diameter, and assume that the resolution (e.g., the size of the contact area for which controller 20 can determine a contact location) is 1 mm². With a size of 254 mm by 254 mm, the distance that the light beam of the optical signal that includes the data pattern divided into a plurality of frames needs to travel is 64,516 mm (254*254).

The speed of light is 3×10" mm/sec. If the index of refraction of touch screen panel 12 is 1.5, then the speed of light through touch screen panel 12 is 3×10" divided 1.5, which is 2×10" mm/sec. Because the distance that the light beam needs to travel through touch screen panel 12 is 64,516 mm, the amount of time it takes the light beam to travel through touch screen panel 12 is 64,516 mm divided 2×10" mm/sec, which is 323 nanoseconds (ns).

In this example, because the resolution is approximate 1 mm², the diameter of the light beam is 1 mm, and the distance the light beam travels is 64,516 mm in touch screen panel 12, the number of bits of frame 26 should be approximate 64,516 bits. Also, because the amount of time it takes the light beam to travel through touch screen panel 12 is 323 ns, if laser 14 outputs frame 26 at 200 giga-hertz (GHz) (i.e., 64,516 divided by 323 ns is approximately 200 GHz), then the first bit of frame 26 may just exit, when the last bit of frame 26 just enters touch screen panel 12.

Figure 7:
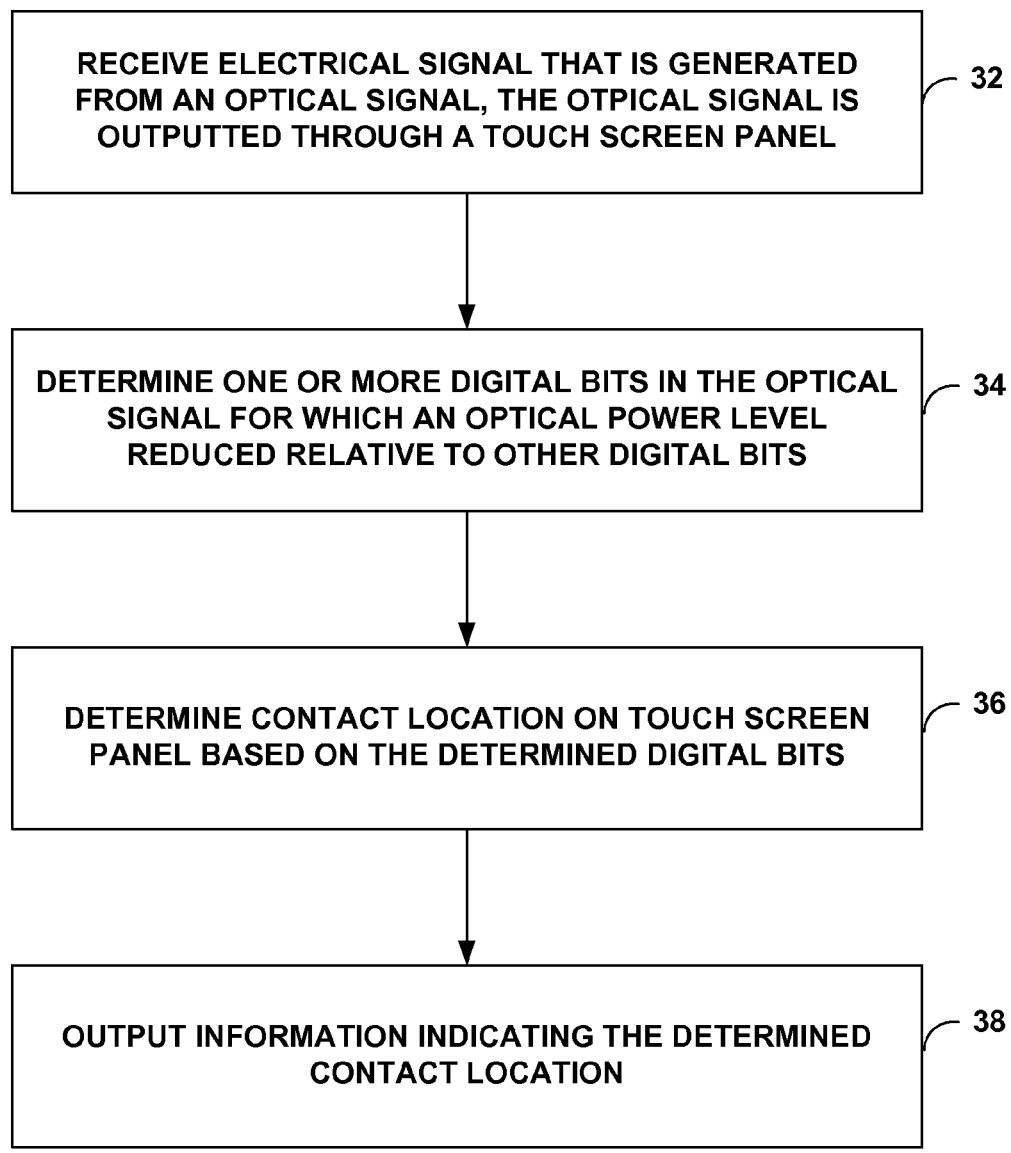
FIG. 7 is a flowchart illustrating a method of interfacing with a touch screen panel in accordance with one or more example techniques described in this disclosure.

FIG. 7 is a flowchart illustrating a method of interfacing with a touch screen panel in accordance with one or more example techniques described in this disclosure. Controller 20 may receive, via detector 18, an electrical signal that is generated from an optical signal, where the optical signal is outputted through touch screen panel 12 (e.g., a side of touch screen panel 12) and includes a plurality of digital bits of a frame of a data pattern (32). For example, detector 18 may receive the optical signal that is outputted out of a side of touch screen panel 12. Detector 18 may convert the optical signal into an electrical signal (e.g., the optical signal into a current signal). Controller 20 may receive the electrical signal (e.g., current signal) from detector 18. In some examples, detector 18, or some other intermediate unit, may convert the current signal into a voltage signal. In these example, the electrical signal that controller 20 receives may be the voltage signal.

For example, laser 14 may transmit the optical signal via a side of touch screen panel (i.e., same side or different side than the side at which detector 18 receives the optical signal). In some examples, laser 14 may transmit the optical signal at a data rate such that a first bit of the frame is to exit touch screen panel 12 at approximately a same time that a last bit of frame 26 is entering touch screen panel 12. In some examples, only one laser 14 may transmit only one optical signal, and only one detector 18 may receive the only one optical signal. In this manner, the electrical signal that controller 20 receives is generated from an optical signal that is outputted through touch screen panel 12, and where the optical signal includes a plurality of digital bits of a frame of a data pattern.

Controller 20 may determine, from the electrical signal, one or more digital bits in frame 26 for which a power level (e.g., optical power level or electrical power level for the electrical signal converted from the optical signal) reduced relative to other digital bits in frame 26 (34). Controller 20 may determine a contact location on touch screen panel 12 where contact with a surface of touch screen panel 12 was made based on the determined digital bits in frame 26 for which the power level reduced relative to other digital bits in frame 26 (36).

Controller 20 may output information indicating the determined contact location (38). For example, controller 20 may output the information indicating the determined contact location to an application executing on a processor that utilizes the information to perform one or more functions (e.g., the operating system receives the information to execute an application, a gaming application performs in a function based on the contact location, etc.).

For example, controller 20 may determine a position in frame 26 of the digital bits for which the power level reduced relative to the other digital bits in frame 26. Controller 20 may determine the contact location based on the determined position in the frame of the digital bits for which the power level reduced relative to the other digital bits in the frame. In some examples, controller 20 may also determine an amount of time after receiving start maker 24 of frame 26 that the digital bit for which the power level is reduced relative to the other digital bits in frame 26 is received. In these examples, controller 20 may determine the contact location based on the determined position in the frame of the digital bits for which the power level reduced relative to the other digital bits in the frame and the determined amount of time.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of interfacing, the method comprising:
   receiving an electrical signal that is generated from an optical signal, wherein the optical signal is outputted through the touch screen panel and includes a plurality of digital bits of a frame of a data pattern;
   determining, from the electrical signal, one or more of the digital bits in the frame for which a power level reduced relative to other digital bits in the frame;
   determining a position in the frame of the digital bits for which the power level reduced relative to the other digital bits in the frame;
   determining a contact location on the touch screen panel where contact with a surface of the touch screen panel was made based on the determined position in the frame of the digital bits for which the power level reduced relative to the other digital bits in the frame; and
   outputting information indicating the determined contact location.

2. The method of claim 1, further comprising: determining an amount of time, after receiving a start marker of the frame, that the determined digital bits are received, wherein determining the contact location comprises determining the contact location based on the determined position in the frame of the digital bits and the determined amount of time.

3. The method of claim 1,
   wherein receiving the optical signal comprises receiving the optical signal from a side of the touch screen panel.

4. The method of claim 3, wherein the side of the touch screen panel comprises a first side of the touch screen panel, the method further comprising:
   transmitting the optical signal via a second side of the touch screen panel at a data rate that causes a first bit of the frame to exit the touch screen panel at approximately a same time that a last bit of the frame is entering the touch screen panel.

5. The method of claim 1, further comprising:
   transmitting one optical signal, and no other optical signal, with one laser or light-emitting-diode (LED), and no other laser or LED,
   wherein receiving the optical signal comprises receiving one optical signal with one detector, and no other detector.

6. A device for interfacing, the device comprising:
   a touch screen panel;
   an optical signal source configured to output an optical signal through the touch screen panel, wherein the optical signal includes a plurality of digital bits of a frame of a data pattern; and
   one or more processors configured to:
      receive an electrical signal generated from the optical signal;
      determine, from the electrical signal, one or more of the digital bits in the frame for which a power level reduced relative to other digital bits in the frame;
      determine a position in the frame of the digital bits for which the power level reduced relative to the other digital bits in the frame;
      determine a contact location on the touch screen panel where contact with a surface of the touch screen panel was made based on the determined position in the frame of the digital bits for which the power level reduced relative to the other digital bits in the frame; and
      output information indicating the determined contact location.

7. The device of claim 6, wherein the one or more processors are configured to determine an amount of time, after receiving a start marker of the frame, that the determined digital bits are received, and wherein, to determine the contact location, the one or more processors are configured to determine the contact location based on the determined position in the frame of the digital bits and the determined amount of time.

8. The device of claim 6,
   wherein to receive the optical signal, the one or more processors are configured to receive the optical signal from a side of the touch screen panel.

9. The device of claim 8, wherein the side of the touch screen panel comprises a first side of the touch screen panel, wherein the optical signal source is configured to transmit the optical signal via a second side of the touch screen panel at a data rate that causes a first bit of the frame to exit the touch screen panel at approximately a same time that a last bit of the frame is entering the touch screen panel.

10. A device for interfacing, the device comprising:
    means for receiving an electrical signal that is generated from an optical signal, wherein the optical signal is outputted through the touch screen panel and includes a plurality of digital bits of a frame of a data pattern;

means for determining, from the electrical signal, one or more of the digital bits in the frame for which a power level reduced relative to other digital bits in the frame;

means for determining a position in the frame of the digital bits for which the power level reduced relative to the other digital bits in the frame;

means for determining a contact location on the touch screen panel where contact with a surface of the touch screen panel was made based on the determined position in the frame of the digital bits for which the power level reduced relative to the other digital bits in the frame; and means for outputting information indicating the determined contact location.

11. The device of claim 10, further comprising: means for determining an amount of time, after receiving a start marker of the frame, that the determined digital bits are received, wherein the means for determining the contact location comprises means for determining the contact location based on the determined position in the frame of the digital bits and the determined amount of time.

12. The device of claim 10,
wherein the means for receiving the optical signal comprises means for receiving the optical signal from a side of the touch screen panel.

13. The device of claim 12, wherein the side of the touch screen panel comprises a first side of the touch screen panel, the device further comprising:
means for transmitting the optical signal via a second side of the touch screen panel at a data rate that causes a first bit of the frame to exit the touch screen panel at approximately a same time that a last bit of the frame is entering the touch screen panel.

14. The device of claim 10, further comprising:
means for transmitting one optical signal, and no other optical signal, with one laser or light-emitting-diode (LED), and no other laser or LED,
wherein the means for receiving the optical signal comprises means for receiving one optical signal with one detector, and no other detector.

15. A non-transitory computer-readable storage medium having instructions stored thereon that when executed cause one or more processors to:
receive an electrical signal that is generated from an optical signal, wherein the optical signal is outputted through the touch screen panel and includes a plurality of digital bits of a frame of a data pattern;

determine, from the electrical signal, one or more of the digital bits in the frame for which a power level reduced relative to other digital bits in the frame;

determine a position in the frame of the digital bits for which the power level reduced relative to the other digital bits in the frame;

determine a contact location on the touch screen panel where contact with a surface of the touch screen panel was made based on the determined position in the frame of the digital bits for which the power level reduced relative to the other digital bits in the frame; and output information indicating the determined contact location.

16. The non-transitory computer-readable storage medium of claim 15, further comprising instructions that cause the one or more processors to:
determine an amount of time, after receiving a start marker of the frame, that the determined digital bits are received,
wherein the instructions that cause the one or more processors to determine the contact location comprise instructions that cause the one or more processors to determine the contact location based on the determined position in the frame of the digital bits and the determined amount of time.

* * * * *